July 4, 1939.  E. O. GROSKOPF  2,164,400
METHOD OF MAKING RUBBER COMPOSITIONS AND THE LIKE
Filed March 16, 1937
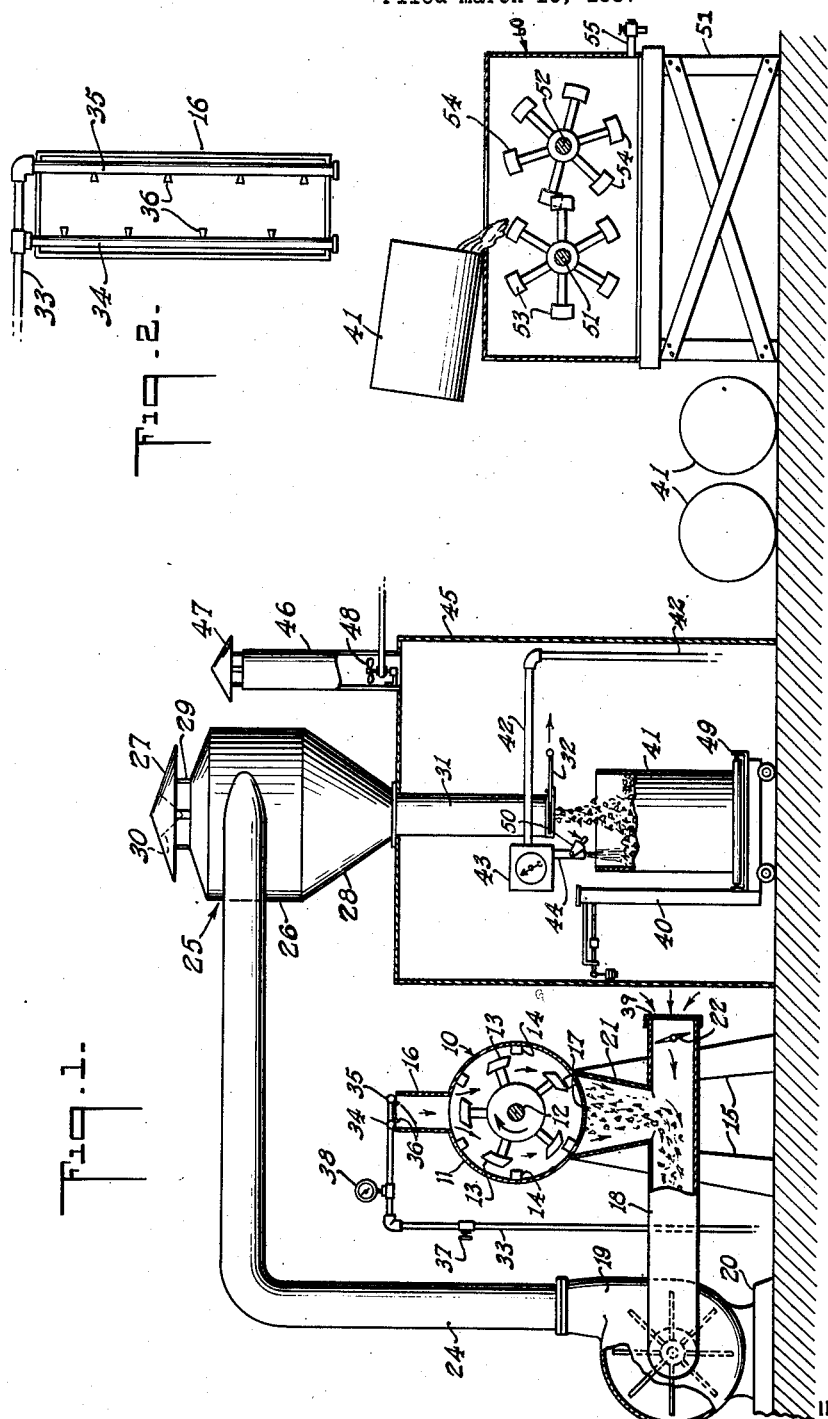
INVENTOR
Edwin O. Groskopf.
BY
Samuel Stearman
ATTORNEY Patented July 4, 1939

2,164,400

UNITED STATES PATENT OFFICE 2,164,400

METHOD OF MAKING RUBBER COMPOSITIONS AND THE LIKE

Edwin O. Groskopf, Rutherford, N. J., assignor to The Patent and Licensing Corporation, New York, N. Y., a corporation of Massachusetts Application March 16, 1937, Serial No. 131,159

6 Claims. (Cl. 134—17)

This invention relates to a new and improved method of preparing solvent cut-backs of rubber, or combinations of rubber and asphalt or other thermo-plastic compositions. The invention more particularly relates to the preparation of such materials to be employed as adhesive cements.

Cut-backs of rubber have been prepared heretofore, according to conventional practice, by subjecting slabs or chunks of reclaimed rubber to a "breaking down" operation generally carried out on a rubber mill. Where an asphalt is included in the cut-back composition, the asphalt is generally incorporated or blended with the rubber during the milling of the rubber. The rubber leaves the mill in the form of tough viscous masses or sheets which are cut into suitable sizes and placed, with the proper proportion of a suitable solvent, for example, naphtha, carbon tetrachloride, benzol or the like, in a churn. Any suitable fillers, pigments and the like, which are desired in the final composition, may be added to the solvent and rubber in the churn. The mixture of solvent, rubber, fillers and the like is then subjected to a churning action for a period of from 12 to 24 hours to produce the cut-back. The substantial period of time required for the churning operation necessitates a churn of comparatively large capacity to enable any commercial amount of the finished cut-back to be produced within a reasonable time. Due to the large capacity churn required and the very tough viscous character of the rubber mass, the churn must necessarily be of heavy construction and high in cost of maintenance and operation.

An object of the present invention is to provide a method of preparing cut-backs of rubber and combinations of rubber with asphalt or other thermo-plastic compositions which, as compared to the prior known processes described above, will produce greater quantities of the cut-back within a given time and with a smaller power-consumption. A further object of the invention is to provide an improved substantially continuous method of producing rubber cut-backs and the like.

According to my invention, reclaimed rubber or the like in slab form is reduced to small fragments, say of from 1/8 inch to 1/2 inch diameter, in a shredding or cutting device of any suitable type. The shredded rubber is then directly conveyed to a preferably portable container such as a drum or the like and mixed with a solvent in the desired proportions. The container, with the proper proportions of solvent and rubber therein, is then stored for, say from 4 to 12 hours more or less, with some agitation of its contents at intervals to prevent settling out of the rubber. The storage period, stated above to be from 4 to 12 hours, will vary within the limits stated depending, for the most part, upon the proportions of rubber and solvent employed, the size of the rubber fragments and the amount of agitation provided for the contents of the drums or other storage container.

Where a drum or the like is employed to hold the rubber and solvent mixture during the storage period, the agitation of the mixture may readily be obtained by partially rotating the drum, say for one-half revolution approximately every half-hour. The drums may, however, be continuously but slowly rotated by any suitable mechanism or an agitating means may be provided within the drum or other container in which the rubber and solvent has been placed.

During the storage period the solvent soaks into the rubber, due to the large aggregate surface area of the shredded rubber fragments as compared with the surface area of the unshredded rubber slab, and causes the rubber to swell and partially dissolve or become partially colloidally suspended in the solvent. At the termination of the storage period the contents of the drum, or other storage container, will be found to be of sponge-like jellied form and readily susceptible to final conversion into a rubber cut-back by strong agitation.

At the termination of the storage period, the rubber solvent mass is transferred from the drums, or other storage container, to a suitable mixer, such as a well-known form of pug mill mixer. At this time suitable fillers, pigments, extenders, precipitators and the like may be added in any desired proportions. The filler, when added to rubber-solvent mass at this time, performs its conventional functions and furthermore produces internal friction within the rubber and increases the swelling thereof whereby the breaking up of the rubber into finely divided form is greatly accelerated.

For the production of cements employing a bituminous material as one constituent thereof, the bituminous material, for example, asphalt which has been cut-back previously with the same or similar solvent as that used for the rubber, may be added. The mixture is stirred in the pug-mill or other mixer for approximately one-half hour. At the completion of the mixing period the rubber is completely dissolved in or dispersed throughout the solvent and the resultant cutback may be run off into suitable containers for storage or shipment or may be transferred to a storage tank for a final mixing to insure uniformity of the viscosity thereof.

In some instances it may be desirable to completely dissolve or disperse the rubber in the solvent by the mixing operation before fillers, extenders, asphalts and the like are added. In this case the rubber and solvent are first mixed for approximately one-half hour in the pug-mill or the like and the resulting cut-back is then transferred to a second mixer where the desired fillers, etc., are added.

By the use of the process briefly described above, heavy churns or other mixers, capable of holding large batches of the ingredients, are unnecessary inasmuch as the rubber, during the storage period, is converted into a soft jelly-like mass which may be converted into the cut-back by agitating the mass for approximately one-half hour. Due to the difference between the one-half hour mixing time of the present method and the 12–24 hours required according to prior practice, a much larger quantity of the cut-back may be produced within a given time and a mixer of relatively low capacity with a consequent saving in maintenance and operating costs may be employed. It is known that in the breaking down of rubber by milling as required in the prior known methods of preparing rubber cut-backs, the rubber suffers loss in its tensile strength and other desirable properties. By the practice of the present method, in which no milling step is required this loss in tensile strength of the rubber is avoided and hence a superior product is obtained.

The invention will be more fully understood from the detailed description thereof which is to follow and from the accompanying drawing in which, Figure 1 is a diagrammatic view, partly in elevation and partly in section, of suitable apparatus which may be employed to carry out the method of the present invention; and Figure 2 is a detail view of a part of the mechanism shown in Figure 1.

Referring to the drawing, a shredder or disintegrating device is indicated generally at 10. The shredder 10 may comprise an elongated cylinder 11 within which is mounted a longitudinal shaft 12 having affixed thereto a series of radial cutting blades 13 extending longitudinally thereof. The cutting edges of the blades 13 are bevelled as shown. A series of longitudinally extending blades 14 are fitted to the inner wall of the cylinder, an edge of each blade co-operating with the blades 13. The arrangement of the co-operating cutting blades 13 and 14 is such as to provide a relatively small clearance between their cutting edges. Rotation of the blades 13, in the direction indicated by the arrow, is effected by connecting the shaft 12 to any suitable source of power (not shown). The shredder is mounted in a somewhat elevated position on any suitable supporting frame as indicated at 15. The upper side of the cylinder is formed with spaced vertically extending walls to provide a connecting feed hopper 16. A water line 33 (see Figs. 1 and 2), connected to any suitable source of water supply, has parallel branch pipes 34, 35 connected thereto which extend over the hopper 16. The pipes 34, 35 are each provided with a number of spray heads 36 spaced longitudinally thereof and in such position on the pipes 34, 35 as to direct their sprays across and into the hopper, as shown. A control valve 37 and a water meter 38 are connected in the water line 33.

The lower side of the cylinder 11 is provided with a foraminous screen or sieve 17 of a suitable mesh, say from ⅛th inch to 1 inch mesh. The screen extends for a substantial portion of the circumference of the cylinder 11 to provide a reasonably large screen area. Below the cylinder 11, and extending in a direction preferably at right angles to the axis of the cylinder, is mounted an elongated conduit 18 which has one of its ends connected to a blower 19 and has its other end covered by an air pervious wire screen 39. A funnel shaped member 21 is provided between the cylinder 11 and the conduit 18. The upper end of the member 21 is connected to the cylinder just outside the limits of and so as to entirely surround the screen or sieve 17. The lower portion of the hopper 21 is reduced in size and is secured to the conduit 18 about an opening therein. A damper 22 of any suitable construction is mounted in the conduit 18 adjacent the screen 39.

The blower 19, of conventional type, is mounted on a base 20 and is driven from any suitable source of power (not shown), but which may preferably be the same as that employed to drive the shaft 12 of the shredder 10. The discharge end of the blower 19 is connected to one end of a conduit 24, the other end of which penetrates the side of a cyclone indicated generally at 25. The cyclone comprises a mainly cylindrical body portion 26, a hood 27 spaced from the body portion by suitable means, such as the spacers shown at 29, and a frusto-conical collector 28. The interior of the hood 27 is provided with an air diffuser comprising an inverted cone 30. The discharge end of the collector 28 is connected to a spout 31 which is provided at its lower end with a gate or valve 32 of any suitable type.

A weighing device indicated generally at 40, and which preferably comprises a platform weighing scale of well-known type, is located in such a position that its platform is beneath the discharge end of the spout 31. The platform of the scale may carry a short section of roller conveyor 49. A feed line 42, which is connected with a suitable tank or other source of supply (not shown) for the solvent is connected to the intake side of a metering device 43 preferably supported above the platform of the scale 40. A short feed line 44, connected to the outlet side of the metering device 43, extends toward the platform of the scale 40 and is of such length as to terminate short of a drum or other container 41 placed on this scale. A quick acting gate-valve 50 is secured to the end of feed line 44.

The portion of the apparatus comprising the spout 31, the weighing device 40 and the solvent feeder is preferably enclosed in a chamber 45, which may be open on one side to provide ready ingress thereto and egress therefrom. The chamber is provided with an air exhaust device comprising a blower 48 in the base of a stack 46, the blower being driven from any suitable source of power (not shown). The upper end of the stack 46 extends into the open air and is provided with a hood 47 of conventional type.

In the operation of the apparatus thus far described, slabs of reclaimed rubber, which usually approximate one-half inch to one inch in thickness, 9 to 24 inches in width and 30 to 32 inches in length are delivered manually, or by any suitable mechanical means, to the hopper 16 of the shredder 10. As the rubber is fed to the hopper the valve 31 in the water line 33 is opened to permit sprays of water to be thrown from the heads 36 onto both sides of the rubber slab to wet the same. The water provides a lubricant for the rubber and expedites the cutting thereof and lessens the danger of heating up and consequent softening of the rubber. The presence of the water also prevents the rubber fragments from sticking to each other and to the parts of the shredder. The rubber is reduced to small lumps or fragments by the cutting action of the blades 13 and 14, the fragments dropping through the screen 17, the hopper 21 and to the conduit 18. The blower 19 is rotated in the proper direction and at such a speed as to induce an air current in the conduit 18 of sufficient force to pick up the rubber fragments directly as they enter the conduit 18 and carry them to the blower. The rubber fragments are then carried by the impelling air current set up by the blower, through the conduit 24 and to the cyclone 25. The damper 22 may be regulated so that a sufficient proportion of the air drawn into the conduit 18 by the fan will enter through the shredder to set up an air current therein of such strength as to dislodge the rubber fragments which may tend to pile up on the screen 17, and carry them through the screen. When the rubber fragments reach the cyclone 25, they drop by gravity to the hopper 28 and into the spout 31, the air and dust passing out of the openings between the hood 27 and body portion 26 of the cyclone.

A suitable container, such as a drum 41, is placed on the conveyor section 49 carried by the platform of the weighing scale 40. The balance of the weighing scale 40 is so adjusted as to tip when the desired weights of solvent and rubber are placed in the drum 41. In determining the proper setting of the balance, allowance must be made for the moisture on the rubber resulting from the wetting of the same as it is fed to the shredder. For example, a suitable mixture of rubber and solvent to provide a cut-back may comprise 212 pounds of the solvent and 140 pounds of rubber, or altogether 352 pounds. The weight of moisture carried by 140 pounds of the rubber will vary from 5 to 10 pounds. To produce the desired mixture the balance of the scale should be set to tip when the total weight on the platform of the scale is equal to 232 pounds plus the tare weight of the empty drum 41, the conveyor section 49, and the estimated weight of the water carried by the rubber.

When the drum or other container 41 is in place and the balance of the scale has been adjusted the gate valve 50 is opened and the required amount of solvent is run into the drum, the proper quantity thereof being determined by the meter 43. While the solvent is running into the drum, or thereafter, the gate 32 is opened and the rubber scraps are permitted to fall by gravity into the drum 41 until the balance of the weighing device is tipped. The drum 41 is then quickly headed and removed to a place of storage. A new drum or container is placed on the scale and the drum filling steps are repeated. The drum filling operation should preferably be a substantially continuous one as long as the shredder 10 is operating inasmuch as any substantial piling up of the rubber fragments in the hopper 28 and spout 31 may cause clogging of the hopper and/or spout due to the tendency of the rubber fragments to adhere to one another.

Due to the highly volatile and inflammable natures of the solvents employed in the making of rubber cut-backs, the scale and solvent feeding device are preferably enclosed in the chamber 45 provided with the exhaust fan 48, the latter discharging the vapors from the chamber through the stack 46 and to the atmosphere. To provide against sparks in the chamber resulting from static charges, the spout, drum, and solvent feed line are each preferably grounded.

The drums 41, or other containers, charged with the required amount of rubber fragments and solvent are stored for a period of say, from 4 to 12 hours, the contents thereof being slightly agitated at intervals to prevent settling out of the rubber. The necessary agitation may readily be provided by rolling the drums for a portion of a turn approximately every one-half hour, though any other suitable way may be employed to keep the rubber suspended in the solvent.

At the completion of the storage period, the drums are emptied into a suitable mixer, such as a pug-mill, indicated generally at 60. The mixer 60 as illustrated is of the conventional double pug-mill type and comprises parallel shafts 51, 52 each provided with radially extending blades 53, 54 which are so mounted and shaped as to set up oppositely directed currents in the material in the mixer when the shafts are rotated in opposite directions from any suitable source of power. Adjacent the lower end of the mixer a drain cock 55 may be provided through which the completed material may be run off into drums, cans or any desired type of storage or shipping container. The mixer 50 may be supported on a suitable base 51.

The material from the drums, preconditioned during the storage period by the action of the solvent on the rubber fragments into what appears as a jelly or sponge like mass, is agitated in the mixer for a period of time sufficient to complete the solution or dispersion of the rubber in the solvent, such period comprising approximately one-half hour where the proportions of rubber and solvent previously referred to (solvent 212 pounds and rubber 140 pounds) are employed. Further quantities of the solvent may be added during the mixing operation to thin the resultant rubber cut-back to any desired consistency.

In the preparation of rubber cut-backs suitable fillers, extenders, precipitators and the like are usually added during the mixing of the rubber and solvent. According to the present method such extenders, fillers, precipitators and the like are preferably introduced into the pug-mill mixer prior to or during the agitation of the solvent and the rubber therein. As heretofore stated, the fillers, when added at this time, accelerate the dispersing or dissolving of the rubber in the solvent, in addition to performing the usual function of modifying the resultant cut-back. At the conclusion of the final mixing operation the rubber cut-back or cement may be drained from the mixer 50 into suitable drums, cans or other shipping or storing containers or may be transferred by blowing or the like to storage tanks where it receives a final mixing to insure uniformity thereof.

The method and apparatus described above may be employed in the production of rubber cut-backs or cements of many varied types and compositions. In order, however, to specifically illustrate the operation of the method of the present invention the following example of the production of a particular rubber-asphalt cement will be given. It is to be understood that the example is given for purposes of illustration only and is not to be construed as limiting the invention thereto.

For the preparation of the rubber cement under consideration, red tube reclaimed rubber, reduced to fragments in the shredder, is placed in drums together with a solvent, in this case comprising hexane, in the proportions of 420 parts of rubber to approximately 630 parts of solvent. All proportions will be given as parts by weight. At the termination of the storage period of the material in the drums, the contents of the drums are emptied into the pug-mill. At this time 300 parts of zinc oxide, 630 parts of selected light colored asphalt cut-back with approximately 110 parts of hexane, 79 parts of denatured alcohol, and 169 parts of hexane, are added to the rubber and solvent in the pug-mill. These ingredients are then agitated in the pug-mill for one-half hour to complete the preparation of the cement.

Having thus described my invention it will be apparent to those skilled in the art that numerous variations and changes may be made therein without departing from the scope of the invention as defined by the appended claims.

What I claim is:

1. A method of preparing rubber cut-backs comprising wetting rubber slabs with water, shredding the rubber slabs while so wetted, conveying the rubber directly as it is shredded to a feeding means, feeding the shredded rubber and a rubber solvent into a container, soaking the shredded rubber in the solvent until a sponge-like jellied mass of rubber and solvent is obtained and then agitating the solvent rubber mass to thereby complete the solution of the rubber in the solvent.

2. A method of preparing rubber cut backs comprising subdividing rubber slabs into a multiplicity of fragments, the aggregate surface area of which is greatly increased over the surface area of the slabs, conveying the rubber fragments in a manner to prevent agglutination of the same into contact with a predetermined amount of solvent, maintaining contact between the rubber and the solvent until a sponge-like jellied mass of rubber and solvent is obtained, and then agitating the solvent-rubber mass thereby effecting complete solution of the rubber in the solvent.

3. A method of preparing rubber cut backs comprising subdividing rubber slabs into a multiplicity of fragments, the aggregate surface area of which is greatly increased over the surface area of the slabs, conveying the rubber fragments directly as they are formed and in a manner to prevent agglutination of the same to a feeding means, feeding predetermined amounts of rubber solvent and of the rubber fragments into a container, maintaining the rubber and solvent in the container in such a manner as to prevent settling out of the rubber and until a sponge-like jellied mass of the rubber and solvent is obtained, and then agitating the solvent and rubber mass thereby effecting complete solution of the rubber in the solvent.

4. A method of preparing cut backs comprising wetting rubber slabs, subdividing the same by continuously acting cutting means into a multiplicity of fragments, having a diameter approximating one-eighth to one-half inch, pneumatically conveying the rubber fragments continuously with their formation to a feeding means, substantially continuously feeding the rubber fragments into contact with a rubber solvent, maintaining contact between the rubber and the solvent until a sponge-like jellied mass of rubber and solvent is obtained, then agitating the solvent-rubber mass thereby effecting complete solution of the rubber in the solvent.

5. A method of preparing rubber cut backs comprising subdividing rubber slabs into a multiplicity of fragments, the aggregate surface area of which is greatly increased over the surface area of the slabs, conveying the rubber fragments in a manner to prevent agglutination of the same into contact with a predetermined amount of solvent, maintaining contact between the rubber and the solvent until a sponge-like jellied mass of rubber and solvent is obtained, adding a bituminous material to the rubber and solvent and then agitating the resultant mix thereby to effect complete solution of the rubber in the solvent.

6. The product as made by the process of claim 2.

EDWIN O. GROSKOPF.